United States Patent
Luo

(10) Patent No.: US 11,140,339 B2
(45) Date of Patent: Oct. 5, 2021

(54) VIDEO IMAGE PROCESSING METHOD, APPARATUS AND TERMINAL

(71) Applicant: TENCENT TECHNOLOGY (SHENZHEN) COMPANY LIMITED, Shenzhen (CN)

(72) Inventor: Shuang Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/854,807

(22) Filed: Apr. 21, 2020

(65) Prior Publication Data
US 2020/0252553 A1   Aug. 6, 2020

Related U.S. Application Data

(63) Continuation of application No. PCT/CN2018/112304, filed on Oct. 29, 2018.

(30) Foreign Application Priority Data

Nov. 14, 2017  (CN) .......................... 201711124135.9

(51) Int. Cl.
*H04N 5/265* (2006.01)
*G06K 9/00* (2006.01)
(Continued)

(52) U.S. Cl.
CPC ......... *H04N 5/265* (2013.01); *G06K 9/00268* (2013.01); *G06T 11/60* (2013.01); *G06T 2200/24* (2013.01)

(58) Field of Classification Search
None
See application file for complete search history.

(56) References Cited

U.S. PATENT DOCUMENTS 9,601,086 B1   3/2017  Chang et al.
2010/0141784 A1   6/2010  Yoo
(Continued)

FOREIGN PATENT DOCUMENTS

CN   105635519 A   6/2016
CN   105677107 A   6/2016
(Continued)

OTHER PUBLICATIONS

The European Patent Office (EPO) the Extended European Search Report for 18879128.9 dated Dec. 4, 2020 8 Pages.
(Continued)

*Primary Examiner* — Yingchun He
(74) *Attorney, Agent, or Firm* — Anova Law Group, PLLC

(57) ABSTRACT

A video image processing method, an apparatus, and a terminal are provided. The method includes: displaying a captured video image on a screen; detecting operating points of a user on the screen, and converting screen coordinates of the operating points into target canvas coordinates in a target canvas; mapping the screen coordinates of the operating points to a virtual canvas, to obtain virtual canvas coordinates of the operating points; mapping the virtual canvas coordinates of the operating points to the target canvas, to obtain target canvas coordinates of the operating points in the target canvas; drawing a graphic image on the target canvas according to the target canvas coordinates of the operating points; and overlaying the target canvas onto the video image.

20 Claims, 8 Drawing Sheets

(51) Int. Cl.
  *G06T 11/60*       (2006.01)
  *G06F 3/0488*      (2013.01)
  *G06F 3/0484*      (2013.01)
  *H04N 5/232*       (2006.01)
  *G11B 27/34*       (2006.01)
  *G11B 27/031*      (2006.01)
  *H04N 21/426*      (2011.01)
  *H04N 21/431*      (2011.01)
  *H04N 21/472*      (2011.01)
  *H04N 5/262*       (2006.01)
  *H04N 21/4335*     (2011.01)
  *H04N 21/81*       (2011.01)
  *G06T 5/00*        (2006.01)

(56) References Cited

U.S. PATENT DOCUMENTS

| | | | | |
|---|---|---|---|---|
| 2011/0304607 | A1* | 12/2011 | Ito | G06T 7/251 |
| | | | | 345/419 |
| 2014/0176601 | A1 | 6/2014 | Hamasaki | |
| 2014/0240343 | A1* | 8/2014 | Tremblay | G06T 11/001 |
| | | | | 345/594 |
| 2015/0253974 | A1 | 9/2015 | Young et al. | |
| 2019/0132642 | A1 | 5/2019 | Wang et al. | |

FOREIGN PATENT DOCUMENTS

| | | |
|---|---|---|
| CN | 106303690 A | 1/2017 |
| CN | 106385591 A | 2/2017 |
| CN | 107291346 A | 10/2017 |
| CN | 107888845 A | 4/2018 |
| EP | 2394714 A1 | 12/2011 |
| EP | 2988486 A1 | 2/2016 |
| WO | 2015130867 A2 | 9/2015 |
| WO | 2016069669 A2 | 5/2016 |

OTHER PUBLICATIONS

The World Intellectual Property Organization (WIPO) International Search Report for PCT/CN2018/112304 dated Jan. 23, 2019 7 Pages (including translation).

* cited by examiner

VIDEO IMAGE PROCESSING METHOD, APPARATUS AND TERMINAL

RELATED APPLICATIONS

This application is a continuation application of PCT Patent Application No. PCT/CN2018/112304, filed on Oct. 29, 2018, which claims priority to Chinese Patent Application No. 201711124135.9, entitled "VIDEO IMAGE PROCESSING METHOD, APPARATUS, AND TERMINAL" filed with the China National Intellectual Property Administration on Nov. 14, 2017, both of which are incorporated by reference in their entirety.

FIELD OF THE TECHNOLOGY

This application relates to the field of image processing technologies, and specifically, to a video image processing method, an apparatus, and a terminal.

BACKGROUND OF THE DISCLOSURE

Currently, most applications supporting video recording (such as a video photography application, an instant messaging application supporting a video call, and a video streaming application) usually provide a function of adding special effects to video images to meet personalization requirements of users. Special effect elements can be added to video images, and the special effect elements include virtual facial accessories, such as a beard or animal's ears, that may be overlaid on a face in a video image, a filter, and the like. The filter may adjust a background theme of a video image, and may be, for example, a filter having effects such as cartoonish or comics-like effects.

Currently, a producer creates special effect elements and then uploads the materials to web pages, or a service provider presets special effect elements in an application. When a special effect element is used on a terminal, the special effect element needs to be downloaded in advance or in real time. However, the special effect elements are usually used for static pictures, and for dynamic video images, when special effects are added to the video images on a terminal, there are some limitations on available special effect elements. Therefore, how to reduce limitations on use of special effect elements and add special effects to video images in a more flexible manner has become a problem that needs to be considered by a person skilled in the art.

SUMMARY

Based on the foregoing description, embodiments of this application provide a video image processing method, an apparatus, and a terminal, to reduce limitations on use of special effect elements, and improve flexibility of adding special effects to a video image.

One aspect of the present disclosure provides a video image processing method. The method includes: displaying a captured video image on a screen; detecting operating points of a user on the screen, and converting screen coordinates of the operating points into target canvas coordinates in a target canvas; mapping the screen coordinates of the operating points to a virtual canvas, to obtain virtual canvas coordinates of the operating points; mapping the virtual canvas coordinates of the operating points to the target canvas, to obtain target canvas coordinates of the operating points in the target canvas; drawing a graphic image on the target canvas according to the target canvas coordinates of the operating points; and overlaying the target canvas onto the video image.

Another aspect of the present disclosure provides a video image processing apparatus. The apparatus includes: a video image display module, configured to display a captured video image on a screen; a coordinate conversion module, configured to detect operating points of a user on the screen, and convert screen coordinates of the operating points into target canvas coordinates in a target canvas; a graphics drawing module, configured to draw a graphic image on the target canvas according to the target canvas coordinates of the operating points; and an overlaying module, configured to overlay the target canvas onto the video image.

Another aspect of the present disclosure provides a terminal, comprising a memory, a processor, and a graphic processing unit; the memory storing an executable program, the program being executable by the processor or the graphic images processing unit, and the program implementing a method. The method includes displaying a captured video image on a screen; detecting operating points of a user on the screen, and converting screen coordinates of the operating points into target canvas coordinates in a target canvas; drawing a graphic image on the target canvas according to the target canvas coordinates of the operating points; and overlaying the target canvas onto the video image.

An embodiment of this application further provides a non-transitory storage medium, the storage medium being configured to store an executable instruction, the instruction, when run on a computer, causing the computer to perform: displaying a captured video image on a screen; detecting operating points of a user on the screen, and converting screen coordinates of the operating points into target canvas coordinates in a target canvas; drawing a graphic image on the target canvas according to the target canvas coordinates of the operating points; and overlaying the target canvas onto the video image.

In the embodiments of this application, a corresponding graphic image can be drawn on a target canvas in an internal memory according to the operating points involved in the doodle drawn by the user on the screen. The target canvas on which the graphic image is drawn may be used as a special effect element. Therefore, content of the special effect element may be adjusted according to a difference (that is, a difference between the operating points involved in the doodle drawn by the user on the screen) between doodle operations of the user on the screen, to make the content of the special effect element adjustable by the user in a personalized manner, and make content of video special effects added to the video image richer and more changeable. As a result, limitations on use of special effect elements are reduced, and flexibility of adding special effects to a video image is improved. For example, in scenarios such as self-photographing and a video call made by a user, special effect elements drawn by the user may be added to images, such as the self-photographed images and video call images, based on the video image processing method provided by the embodiments of this application. Further, by adding drawn special effect elements to video images in a form of a sticker, in dynamic video images captured in a scenario such as self-photographing or a video call, the special effect elements drawn can move along with a face in the dynamic video images.

BRIEF DESCRIPTION OF THE DRAWINGS

To describe the technical solutions in the embodiments of this application or in the existing technology more clearly, the following briefly describes the accompanying drawings required for describing the embodiments or the related technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. Based on the embodiments in the application, all other embodiments obtained by a person skilled in the art without paying any creative efforts all fall within the protection scope of the application.

Embodiments of this application can support a user to perform a doodle operation on a video image, a corresponding graphic image is drawn on a canvas according to the doodle operation of the user, and the canvas is overlaid on the video image, to achieve the objective of adding a special effect to the video image. In the embodiments of this application, a corresponding graphic image may be drawn on a canvas based on a doodle operation of the user, and the canvas may be used as a special effect element, so that content of the special effect element can be flexibly changed by different doodle operations of the user. Embodiments of the present disclosure reduce limitations on use of special effect elements and improve flexibility of adding special effects to video images.

Figure 1:
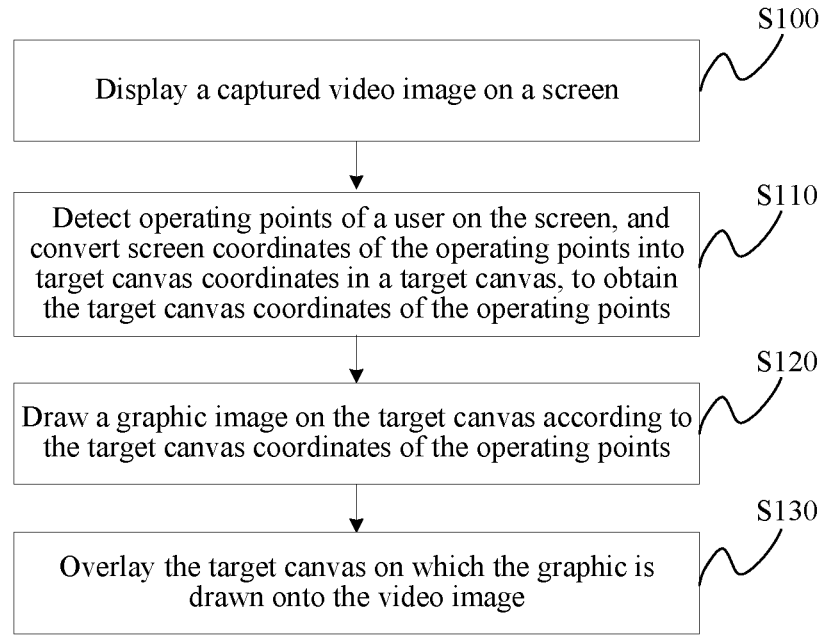
FIG. 1 is a flowchart of a video image processing method according to an embodiment of this application.

Accordingly, FIG. 1 shows a flowchart of a video image processing method according to an embodiment of this application. The method may be applied to a terminal, and the terminal may be a user device, such as a smart mobile phone, a tablet computer, and a notebook computer, used by a user. In this embodiment, a program corresponding to the video image processing method is loaded in a terminal, to enable the terminal to execute the program to implement the video image processing method provided in this embodiment.

In some embodiments, the program may be executed by a graphic processing unit (GPU) of the terminal. In one embodiment, the video image processing method provided in this embodiment may be implemented by an open graphic images library (OpenGL) of the GPU in this embodiment. For example, the program is executed by the OpenGL of the GPU, to implement the video image processing method provided in this embodiment.

Referring to FIG. 1, the video image processing method may include:

Step S100. Display a captured video image on a screen.

When a user is in scenarios such as self-photographing, a video call, and video streaming, the user may initiate an application loaded in a terminal, that supports video recording. The user may capture a video image by invoking image capturing apparatuses, such as a camera, of the terminal through the application, and the captured video image may be transmitted to the application in a callback manner and displayed on a screen of the terminal. It may be understood that the video image indicated in this embodiment may be an image during video recording, or may be a preview image before video recording. The preview image refers to an image captured by an image capturing apparatus, such as a camera, before recording, and the preview image may change as the camera moves. For example, when the user invokes the camera of the terminal to perform the video recording operation through the application, the location of the camera may be further moved by moving the location of the terminal. During the movement process, an image of a corresponding location is displayed on the screen of the terminal, and the image is the preview image. The video image processing method according to this embodiment may be further applied to other scenarios. For example, before the user takes a photo by using a camera, the image captured by the image capture apparatus such as the camera may also be considered as a video image. As the camera moves, the image captured by the image capture apparatus may also change. That is, the video image displayed on the screen may also change.

In some embodiments, a form of the application supporting video recording may depend on an actual situation. For example, in a self-photographing scenario, the application may be a video photographing application; in a video call scenario, the application may be an instant messaging application; and in a video streaming scenario, the application may be a video streaming application.

Step S110. Detect operating points of a user on the screen, and convert screen coordinates of the operating points into target canvas coordinates in a target canvas, to obtain the target canvas coordinates of the operating points.

After entering a doodle mode, the user may doodle on the screen of the terminal by using a finger or a stylus as a brush. In this embodiment, operating points of the user on the screen may be detected, and screen coordinates of the operating points may be recorded based on an operation sequence of the operating points, to respectively convert the screen coordinates of the operating points into target canvas coordinates in the target canvas according to the operation sequence of the operating points.

In this example, the terminal may detect the operating points of the user on the screen in response to an operation of the user for triggering entering the doodle mode. The user may trigger entering the doodle mode through various operations. One operation is tapping an icon corresponding to the doodle mode in a special effect element panel, and another operation may be a touch and hold operation of the user on the screen of the terminal.

Figure 2:
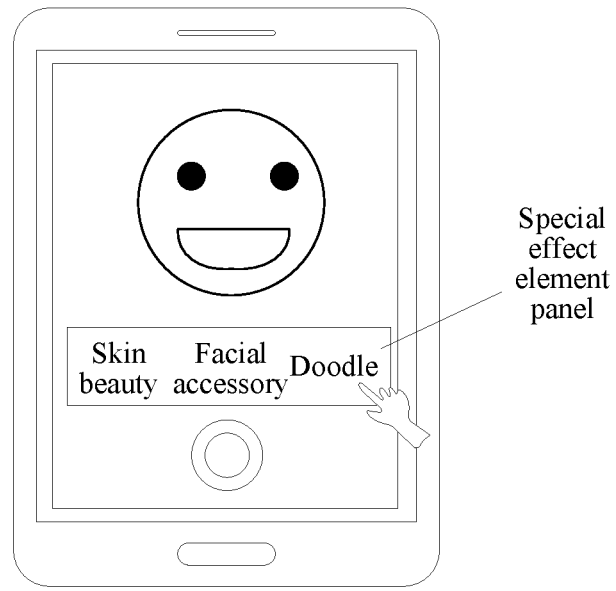
FIG. 2 is a schematic diagram of an interface operation for entering a doodle mode.

In some embodiments, a manner of entering the doodle mode based on the operation of the user may be, for example, as shown in FIG. 2, expanding and showing a special effect element panel based on the operation of the user. Special effect elements, such as conventional virtual facial pendants and filters, may be displayed on the special effect element panel. In this embodiment, an icon for triggering entering the doodle mode is added to the special effect element panel, and entering the doodle mode is triggered when the user taps the icon. After the doodle mode is entered, the user may perform a doodle operation on a screen displaying video images. Obviously, the icon for triggering entering a doodle mode is not necessarily added to the special effect element panel, and may alternatively be independently displayed in the screen.

Further, when the user taps the icon to trigger entering the doodle mode, the screen may display prompt information indicating that the user can perform a doodle operation. For example, the screen may display prompt information "drawing is allowed on the screen", to prompt the user that a doodle operation may be performed subsequently.

In some embodiments, the manner for entering the doodle mode by tapping an icon shown in FIG. 2 is merely optional. In this embodiment, whether the user performs a set operation, such as a touch and hold operation (a set operation, such as touch and hold operation, may be specified as a start operation for a user to doodle, the set operation may alternatively be double-tapping the screen, and the form is not fixed), on the screen may alternatively be detected after a video image is displayed on the screen. In a case that the user performs the set operation, it is determined that the user has an intention to doodle on the screen, and entering the doodle mode may be triggered.

When the doodle mode is entered, in one embodiment of this application, a memory space for the target canvas may be applied for in an internal memory, where a main function of the target canvas is to draw a corresponding graphic image on the target canvas based on the operation of the user on the screen, to obtain a special effect element. The target canvas indicated herein is a canvas for which a memory space is already applied for in an internal memory.

The size of the memory space that is used for the target canvas, may be determined according to a preset target canvas size (the target canvas size herein refers to a resolution of the target canvas) and internal memory occupied by each pixel. For example, the memory space may be used for the target canvas, according to the target canvas size*a value of the internal memory occupied by each pixel (* represents multiplication). That is, the size of the memory space that is applied for, for the target canvas, may be the target canvas size*the internal memory occupied by each pixel. For example, in an example that preset target canvas resolution is 512*512 (which an example), then the size of the memory space that is applied for, for the target canvas, may be 512* 512* the internal memory occupied by each pixel.

The target canvas coordinates refer to mapped canvas coordinates of the screen coordinates of the operating points on the target canvas for which a memory space is applied for. Because in this embodiment, the memory space is applied for, for the target canvas, converting the screen coordinates of the operating points into target canvas coordinates in the target canvas may be considered as mapping the operating points into the memory space corresponding to the target canvas.

Step S120. Draw a graphic image on the target canvas according to the target canvas coordinates of the operating points.

After the screen coordinates of the operating points are converted into the target canvas coordinates in the target canvas, in this embodiment, mapped points of the operating points in the target canvas may be determined according to the target canvas coordinates of the operating points. Therefore, the mapped points of the operating points in the target canvas (for example, connection is performed according to the operation sequence of the operating points) may be further connected according to a brush algorithm (for example, a straight-line brush and a texture brush), to draw a corresponding graphic image.

It may be apparent that, the doodle indicated in this embodiment may be considered as the user performs a drawing operation on the screen by using a finger or a stylus as a brush. By using the mapped points of the operating points involved in the painting operation on the target canvas, graphic image drawing may be implemented on the target canvas. The doodle mode indicated in this embodiment may be considered as a mode allowing the user to perform a drawing operation on the screen by using a finger or a stylus.

It may be understood that, the user performs an operation, such as sliding, on the screen by using a finger or a stylus, and at least one operation track may be formed by the operating points on the screen. In a case that graphic image drawing is performed based on the mapped points of the operating points on the target canvas, a graphic image similar in form to the operation track may be drawn on the target canvas.

Step S130. Overlay the target canvas on which the graphic image is drawn onto the video image.

The target canvas on which the graphic image is drawn may be used as a sticker-type special effect element, and may be overlaid onto the video image based on a principle of overlaying a sticker onto a video image.

In some embodiments, the graphic image drawn on the target canvas may be overlaid onto the video image in real time, to enable the user to perform modification and adjustment on the graphic image by adjusting the doodle operation based on the graphic image of the target canvas overlaid onto the video image in real time.

The video image processing method provided in this embodiment supports the user to doodle on the video image. Specifically, the captured video image is displayed on the screen, so that the user may trigger, based on the video image, entering the doodle mode. Based on this, after the operating points of the doodle performed by the user on the screen are detected, and the screen coordinates of the operating points are converted into the target canvas coordinates in the target canvas, graphic image drawing is performed on the target canvas according to the target canvas coordinates of the operating points, and then the target canvas on which the graphic image is drawn, serving as special effect element, is overlaid onto the video image, to produce the effect of doodling on the video image. The video image processing method of this embodiment makes it possible to doodle based on a dynamic video image in real time, and is essentially different from a conventional manner of doodling by using a video image in a static picture form as a canvas.

Figure 3:
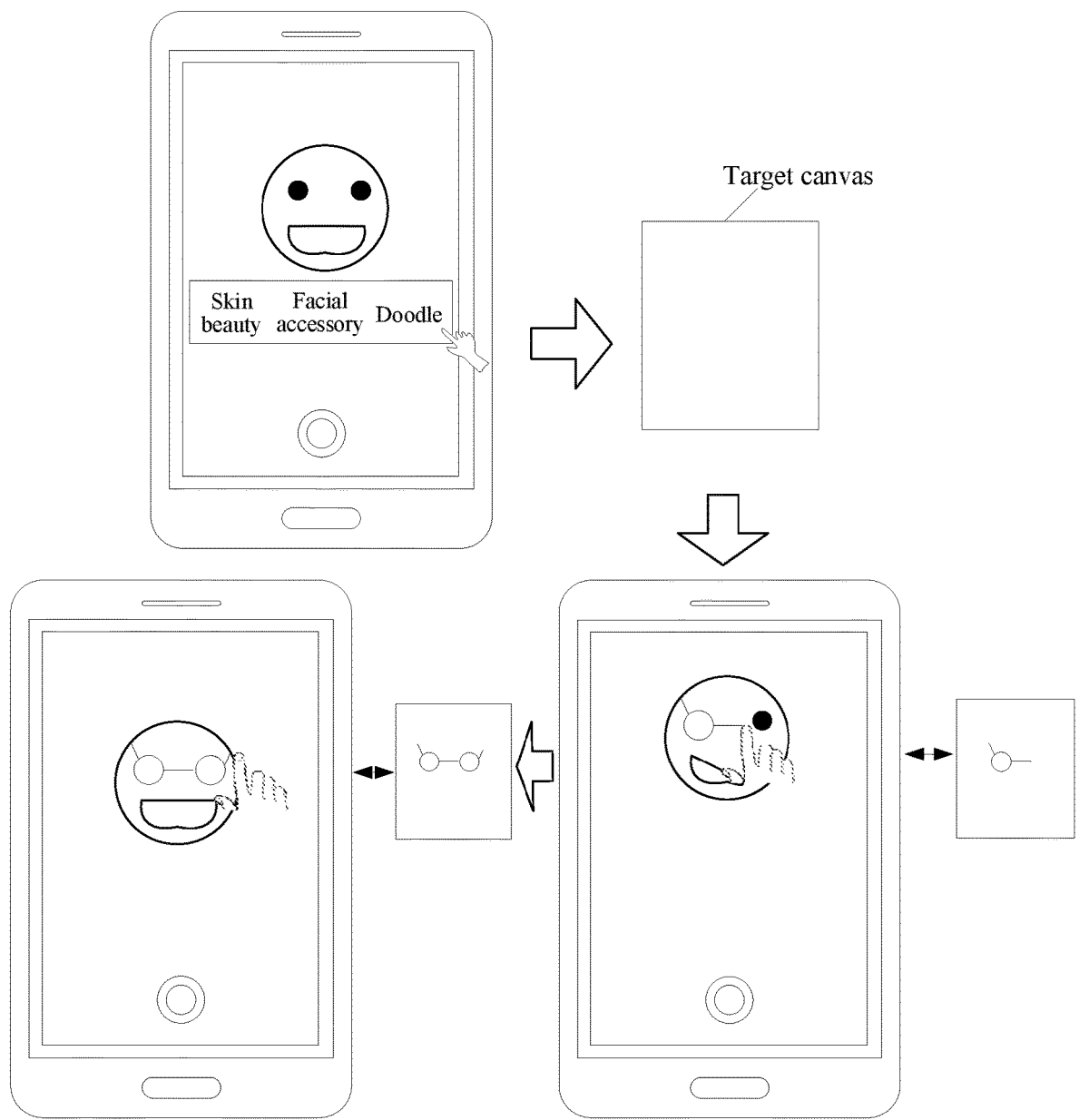
FIG. 3 is a schematic diagram of an application of an embodiment of this application.

In one example, as shown in FIG. 3, the user opens a video photographing application of the terminal to perform self-photographing, and a front camera of the terminal may capture a video image including a face of the user and display the video image on a screen of the terminal. The user taps a "doodle" icon on the special effect element panel, to trigger entering a doodle mode, and the terminal may initialize the target canvas, to apply for a memory space for the target canvas. In addition, the user may perform a doodle operation on the screen by using a finger with reference to a location of the face of the user in the video image displayed on the screen, and as shown in FIG. 3, performs the doodle operation by sliding the finger of the user on the screen, and a sliding track of the finger on the screen is similar in form to "glasses".

In the sliding process of the finger of the user on the screen, the terminal may record the screen coordinates of the operating points involved in the sliding process and convert the screen coordinates of the operating points into the target canvas coordinates in the target canvas, to obtain the mapped points in the target canvas corresponding to the operating points. Therefore, the mapped points in the target canvas corresponding to the operating points may be connected according to the target canvas coordinates of the operating points, to draw a graphic image similar in form to "glasses" on the target canvas.

The target canvas on which a graphic image similar in form to "glasses" is drawn may be overlaid onto the face of the user in the video image in a form of a sticker, and an effect that the graphic image similar in form to "glasses" on the target canvas moves along with the face in the video image is produced (the effect is that, for example, dynamic stickers, such as virtual facial pendants, move along with the face in the video image), to achieve the objective of doodling on a face of the user in the video image.

The finger of the user in FIG. 3 actually draws a mobile doodle on the screen, and the effect of adding a graphic image onto the video image displayed by the screen is actually an effect presented by overlaying the target canvas onto the video image after graphic image drawing is performed on the target canvas based on the mobile doodle drawn by the finger of the user on the screen.

The manner of triggering entering a doodle mode shown by the content of a corresponding part in FIG. 3 is merely optional, and may be considered as an example for ease of understanding.

The video image processing method provided in the embodiments of this application includes: after displaying a captured video image on a screen, in a case that the doodle mode is entered according to the user operation, applying for a memory space for the target canvas, to cache the target canvas in an internal memory; detecting operating points involved in a doodle drawn by a user on the screen after the doodle mode is entered, and converting screen coordinates of the operating points into target canvas coordinates in the target canvas, to obtain the target canvas coordinates of the operating points; further drawing a graphic image on the target canvas according to the target canvas coordinates of the operating points; and overlaying the target canvas on which the graphic image is drawn onto the video image, to produce an effect of adding, to the video image, a special effect of a graphic image doodled by a user.

In the embodiments of this application, a corresponding graphic image can be drawn on a target canvas in an internal memory according to the operating points involved in the doodle drawn by the user on the screen, and the target canvas on which the graphic image is drawn may be used as a special effect element. Therefore, content of the special effect element may be adjusted according to a difference (that is, a difference between the operating points involved in the doodle drawn by the user on the screen) between doodle operations of the user on the screen, to make the content of the special effect element adjustable by the user in a personalized manner, and make content of video special effects added to the video image richer and more changeable. As a result, limitations on use of special effect elements are reduced, and flexibility of adding special effects to a video image is improved. For example, in scenarios such as self-photographing and a video call made by a user, special effect elements drawn by the user may be added to images, such as self-photographed images and video call images, based on the video image processing method provided by the embodiments of this application. Further, by adding drawn special effect elements to video images in a form of a sticker, in dynamic video images correspondingly captured in a scenario such as self-photographing or a video call, an effect that the drawn special effect elements move along with a face in the dynamic video images can be produced.

In some embodiments, in one embodiment for converting the screen coordinates of the operating points into the target canvas coordinates in the target canvas, in this embodiment, a virtual canvas (the virtual canvas is different from the target canvas for which memory space is applied for) may be drawn first, and a size of the virtual canvas is adjustable. Specifically, the size of the virtual canvas and a size of a facial feature area in the video image are in a preset proportional relationship, where the preset proportional relationship may be set according to an actual requirement. As an example of this application, the virtual canvas may be zoomed down or up according to a size of a face by using nasal bone of the face as a center. During specific implementation, it may be assumed that the virtual canvas is square-shaped, and a width of the virtual canvas may be twice a spacing between two eyes of the face. Subsequently, the screen coordinates of the operating points are mapped to the virtual canvas, to obtain virtual canvas coordinates of the operating points, and the virtual canvas coordinates of the operating points are then mapped to the target canvas, to obtain target canvas coordinates of the operating points in the target canvas.

In some embodiments, this manner is applicable to a scenario of adding video special effects to a face in a video image. In a case that the memory space that is applied for, for the target canvas, is fixed, the size of the target canvas is inapplicable to diversity of faces. Therefore, adaptation to the diversity of faces may be performed by using a virtual canvas as an intermediate state of coordinate conversion from the screen coordinates of the operating points to the target canvas coordinates, so that the conversion from the screen coordinates of the operating points to the target canvas coordinates of the target canvas is more precise.

Figure 4:
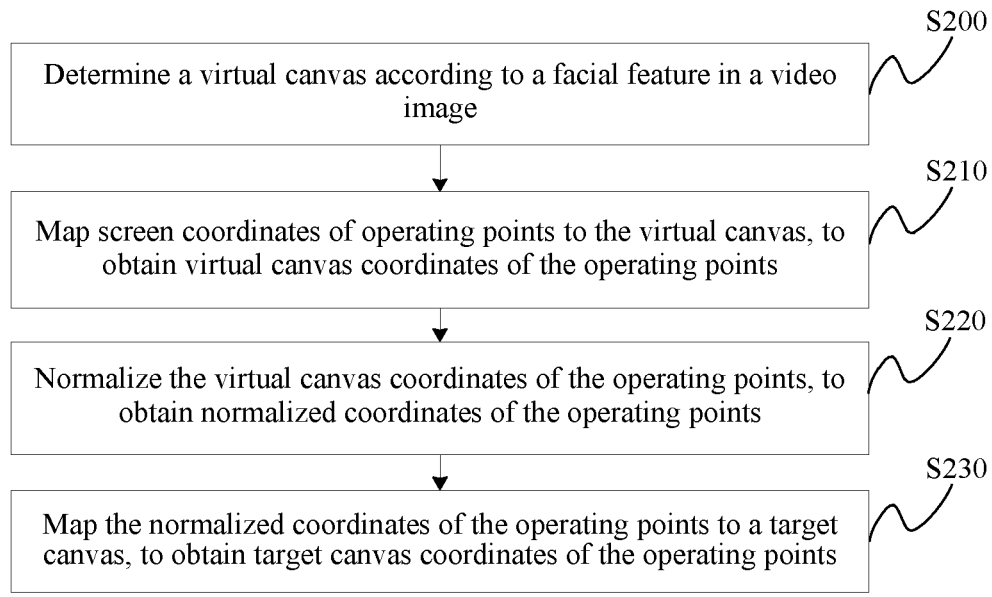
FIG. 4 is a flowchart of a method for converting screen coordinates of operating points into target canvas coordinates.

In some embodiments, FIG. 4 shows a flowchart of a method for converting screen coordinates of operating points into target canvas coordinates according to an embodiment of this application. The method is applicable to a terminal, and for example, the method may be performed and implemented by a GPU of the terminal. Referring to FIG. 4, the method may include:

Step S200. Determine a virtual canvas according to a facial feature in the video image.

The virtual canvas is different from the target canvas indicated above, and a size of the virtual canvas and a size of the facial feature area in the video image are in a preset proportional relationship. In this embodiment, the size may be represented by a resolution. The size of the target canvas, that is, a resolution of the target canvas, is preset. The size of the virtual canvas, that is, a resolution of the virtual canvas, may be adjusted according to a resolution of the face in the video image. That is, for video images in which resolutions of a face are different, resolutions of virtual canvas drawn correspondingly may also be different. For example, when a user performs self-photographing, due to different distances to a camera, resolutions of a face in video image are also different, and a resolution is relatively small when a distance is relatively large. That is, in this embodiment, the virtual canvas may be drawn according to the facial features in the video image.

In one embodiment, in this embodiment, screen coordinates of a first feature point of a face in the video image are detected by using a face detection technology (using a face as an example, the first feature point may be a set facial feature point of the face, for example, the nasal tip, the between-the-eyebrows, or the nasal bone, and a form of the first feature point of the face may be set according to an actual situation). Then, the size of the virtual canvas is determined according to the preset proportional relationship and the size of the face area in the video image, and then, the virtual canvas is determined according to the size of the virtual canvas by using the coordinates of the first feature point of the face as a central point of the virtual canvas.

In some embodiments, the preset proportional relationship may be set according to an actual situation. A specific value may be self-adjusted provided that the virtual canvas may cover most of the screen.

Step S210. Map the screen coordinates of the operating points to the virtual canvas, to obtain virtual canvas coordinates of the operating points.

In some embodiments, after the virtual canvas is determined, for any operating point, in this embodiment, the screen coordinates of the operating points may be converted into coordinates in the virtual canvas according to the screen coordinates of the operating points and screen coordinates of the central point of the virtual canvas (that is, the coordinates of the first feature point of the face in the video image), to obtain virtual canvas coordinates of the operating points. During specific implementation, regarding the operating points, the terminal may obtain coordinate translation vectors through calculation according to the screen coordinates of the operating points and the screen coordinates of the central point of the virtual canvas, and determine the virtual canvas coordinates of the operating points according to the coordinate translation vectors.

Obviously, the foregoing manner for converting the screen coordinates of the operating points into the coordinates in the virtual canvas is merely optional. In this embodiment, by recording a mapping relationship between a coordinate system of the screen and a coordinate system of the virtual canvas, the coordinates obtained through conversion of the screen coordinates of the operating points in the virtual canvas are determined according to the mapping relationship.

Step S220. Normalize the virtual canvas coordinates of the operating points, to obtain normalized coordinates of the operating points.

Figure 5:
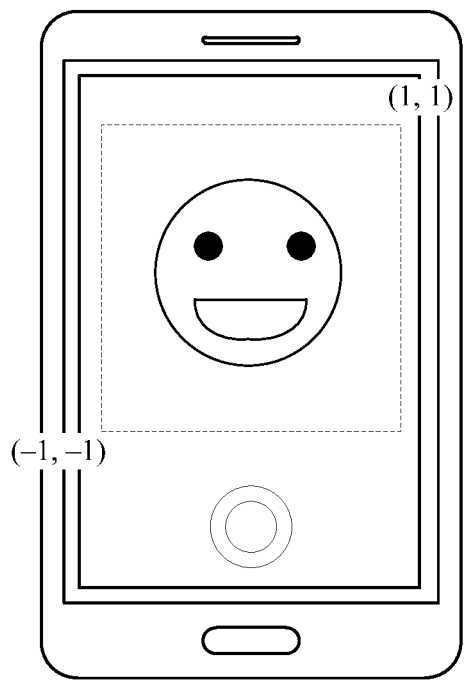
FIG. 5 is a schematic diagram of a normalized virtual canvas.

In some embodiments, the size of the normalized virtual canvas may be set in this embodiment, and for ease of description, the size may be recorded as a specified normalized size. For example, after the virtual canvas is normalized, in a case that ranges of the virtual canvas in an x axis direction and a y axis direction are both from −1 to 1, then it may be considered that a size of the virtual canvas is 2*2, as shown in FIG. 5. In some embodiments, the specified normalized size may be customized and adjusted according to an actual situation, in addition to the case shown in FIG. 5 that the normalized virtual canvas may be set to be square-shaped and has a width of 2, a width of the normalized virtual canvas may alternatively be set to 4 (for example, ranges of the virtual canvas in the x axis direction and the y axis direction are both from −2 to 2).

After the specified normalized size is determined, in this embodiment, a first coordinate scaling ratio may be determined according to the size of the virtual canvas and the specified normalized size. For example, the first coordinate scaling ratio may be obtained by dividing the width of the normalized virtual canvas by the width of the virtual canvas when it is drawn.

For example, in a case that the width of the normalized virtual canvas is set to 2, and the width of the virtual canvas when it is drawn is 680, then the first coordinate scaling ratio is scale=2/680.

After the first coordinate scaling ratio is obtained, initial normalized coordinates of the operating points in the virtual canvas may be determined according to the coordinates of the operating points in the virtual canvas and the first coordinate scaling ratio. For example, the initial normalized coordinates of the operating points in the virtual canvas are obtained by multiplying the coordinates of the operating points in the virtual canvas by the first coordinate scaling ratio.

In some embodiments, the manner for determining the initial normalized coordinates of the operating points in the virtual canvas shown above is optional. In this embodiment, a mapping relationship between the coordinate system of the virtual canvas and the coordinate system of the normalized virtual canvas may also be set, and the initial normalized coordinates of the operating points are obtained according to the mapping relationship.

After the initial normalized coordinates of the operating points in the virtual canvas are obtained, subsequent processing for obtaining the normalized coordinates of the operating points may be performed by distinguishing a case in which a rotation angle of the face in the video image is 0 and a case in which a rotation angle of the face in the video image is not 0.

Specifically, in a case that the rotation angle of the face in the video image is 0, the initial normalized coordinates of the operating points in the virtual canvas may be directly used as the normalized coordinates of the operating points. That is, once the initial normalized coordinates of the operating points in the virtual canvas are obtained, it may be considered that the normalized coordinates of the operating points are obtained.

In a case that the rotation angle of the face in the video image is not 0, after the initial normalized coordinates of the operating points are obtained, the initial normalized coordinates of the operating points also need to be rotated by the rotation angle in a reversed direction, to obtain the normalized coordinates of the operating points.

Step S230. Map the normalized coordinates of the operating points to the target canvas, to obtain target canvas coordinates of the operating points.

After the normalized coordinates of the operating points are obtained, in this embodiment, a second coordinate scaling ratio may be determined according to the size of the target canvas and the specified normalized size. For example, the second coordinate scaling ratio may be obtained by dividing the width of the target canvas by the width of the normalized virtual canvas.

For any operating point, target canvas coordinates of the operating point in the target canvas may be obtained according to normalized coordinates of the operating point and the second coordinate scaling ratio. For example, an x-axis target canvas coordinate of the operating point may be obtained by adding a normalized x-axis coordinate to a preset value and then multiplying the obtained sum by the second coordinate scaling ratio, a y-axis target canvas coordinate of the operating point may be obtained by subtracting a normalized y-axis coordinate of the operating point from a preset value and then multiplying the obtained difference by the second coordinate scaling ratio, and the target canvas coordinates of the operating point in the target canvas are obtained by combining the x-axis target canvas coordinate and the y-axis target canvas coordinate of the operating point.

In some embodiments, the preset value may be customized according to an actual situation, and may be specifically determined according to the size of the virtual canvas. For example, the size of the virtual canvas is 2*2, and a central point thereof is an origin point. In addition, in the target canvas, a mapped point of a vertex in an upper left corner in the target canvas is used as an origin point, a positive direction of an x axis faces towards right, a positive direction of a y axis faces downward, and a preset value is 1. For normalized coordinates (x', y') of the operating point, the central point is first translated, to obtain (1+x', 1−y'), and the second coordinate scaling ratio is 512/2 (where the 512 is assumed to be the width of the target canvas, and 2 is assumed to be the width of the normalized virtual canvas). The target canvas coordinates (1+x', 1−y')*512/2 of the operating point in the target canvas may be obtained in the following manners.

In some embodiments, step S220 to step S230 are merely one example of converting the coordinates of the operating points in the virtual canvas into the target canvas coordinates of the operating points in the target canvas. In this embodiment, a coordinate mapping relationship between the virtual canvas and the target canvas may also be set, and the coordinates of the operating points in the virtual canvas are converted to the target canvas coordinates in the target canvas according to the coordinate mapping relationship.

In this embodiment, when a doodle is drawn on the face in the video image, the virtual canvas drawn based on the face of the video image is adapted to diversity of faces by using a virtual canvas as an intermediate state of coordinate conversion from the screen coordinates of the operating points to the target canvas coordinates, so that the conversion from the screen coordinates of the operating points to the target canvas coordinates of the target canvas is more precise, and accuracy of subsequently overlaying the target canvas on which the graphic image is drawn on the face in the video image is improved.

Figure 6:
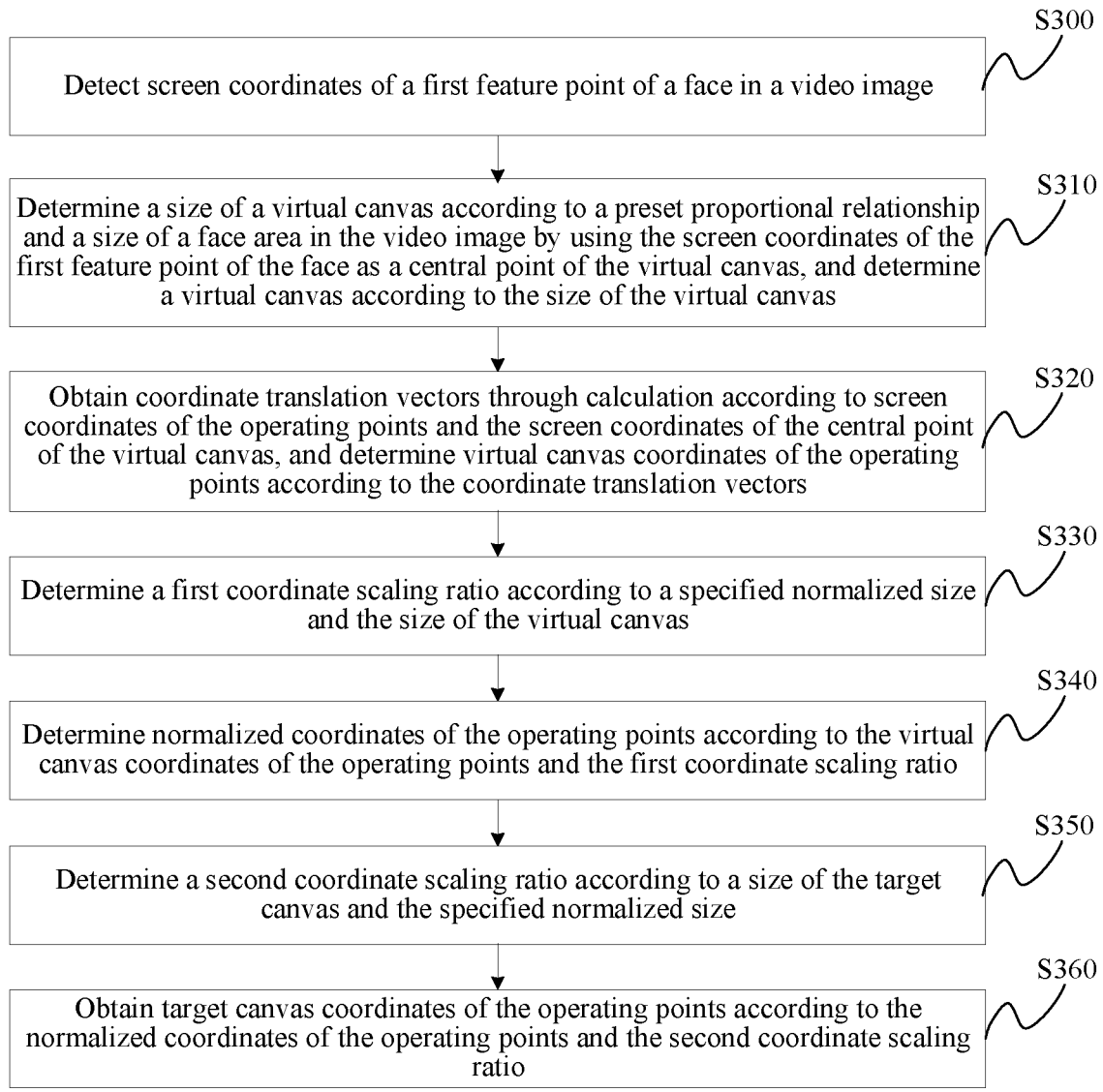
FIG. 6 is a flowchart of another method for converting screen coordinates of operating points into target canvas coordinates.

In some embodiments, in a case that the rotation angle of the face in the video image is 0, FIG. 6 shows a flowchart of another method for converting screen coordinates of operating points into target canvas coordinates according to an embodiment of this application. Referring to FIG. 6, the method may include:

Step S300. Detect screen coordinates of a first feature point of a face in the video image.

Step S310. Determine a size of a virtual canvas according to a preset proportional relationship and a size of a face area in the video image by using the screen coordinates of the first feature point of the face as a central point of the virtual canvas, and determine a virtual canvas according to the size of the virtual canvas.

In some embodiments, step S300 to step S310 may be considered as one embodiment of step S200 shown in FIG. 4, where the rotation angle of the face in the video image is 0.

Step S320. For operating points, obtain coordinate translation vectors through calculation according to screen coordinates of the operating points and the screen coordinates of the central point of the virtual canvas, and determine virtual canvas coordinates of the operating points according to the coordinate translation vectors.

The coordinate translation vectors may be obtained by performing a subtraction operation on the screen coordinates of the operating points and the screen coordinates of the central point of the virtual canvas. Because the virtual canvas is obtained by translating the central point, in the coordinate translation vectors, a component in an x direction may be considered as an x-axis coordinate of the virtual canvas, and a component in a y direction may be considered as a y-axis coordinate of the virtual canvas. In this way, coordinates of the operating points in the virtual canvas are obtained by subtracting the x-axis coordinate of the central point of the virtual canvas from x-axis screen coordinates of the operating points and subtracting the y-axis coordinate of the central point of the virtual canvas from y-axis screen coordinates of the operating points. The coordinates of the operating points in the virtual canvas are the virtual canvas coordinates of the operating point. In some embodiments, step S320 may be considered as an implementation for mapping the screen coordinates of the operating points to the virtual canvas, to obtain virtual canvas coordinates of the operating points, in step S210 shown in FIG. 4.

In one embodiment, assuming that the coordinates (that is, the coordinates of the first feature point of the face in the video image) of the central point of the virtual canvas are P1(360, 500), and screen coordinates of one operating point are P0(120, 660), then coordinates of the operating point in the virtual canvas after conversion may be: P2=(120−360, 660−500)=(−240, 160). That is, the coordinates of the operating point in the virtual canvas after conversion may be obtained by subtracting the x-axis coordinate of the central point of the virtual canvas from an x-axis screen coordinate of the operating point and subtracting the y-axis coordinate of the central point of the virtual canvas from a y-axis screen coordinate of the operating point.

That is, assuming that the coordinates of the central point of the virtual canvas are P1(P1x, P1y), and the screen coordinates of the operating point are P0(P0x, P0y), then the coordinates of the operating point in the virtual canvas after conversion, that is, the virtual canvas coordinates, are P2(P2x, P2y)=(P0x−P1x, P0y−P1y).

In some embodiments, step S320 is processing based on a two-dimensional coordinate system. In a three-dimensional coordinate system, in a case that Euler angle detection (an angle between the rotation angle of the face and x, y, and z axes in the three-dimensional space) is further supported in face detection, coordinates of the operating point in the virtual canvas are obtained by subtracting the x-axis coordinate of the central point of the virtual canvas from an x-axis screen coordinate of the operating point, subtracting the y-axis coordinate of the central point of the virtual canvas from a y-axis screen coordinate of the operating point, and further multiplying the obtained results by a three-dimensional rotation matrix.

A form of the three-dimensional rotation matrix is as follows:

$$M(\alpha, \beta, \gamma) = \begin{bmatrix} \cos\alpha\cos\gamma - \cos\beta\sin\alpha\sin\gamma & -\cos\beta\cos\gamma\sin\alpha - \cos\alpha\sin\gamma & \sin\alpha\sin\beta \\ \cos\gamma\sin\alpha + \cos\alpha\cos\beta\sin\gamma & \cos\alpha\cos\beta\cos\gamma - \sin\alpha\sin\gamma & -\cos\alpha\sin\beta \\ \sin\beta\sin\gamma & \cos\gamma\sin\beta & \cos\beta \end{bmatrix}$$

Step S330. Determine a first coordinate scaling ratio according to a specified normalized size and the size of the virtual canvas.

In some embodiments, the first coordinate scaling ratio may be obtained by dividing the width of the normalized virtual canvas by the width of the virtual canvas when it is drawn.

Step S340. Determine normalized coordinates of the operating points according to the virtual canvas coordinates of the operating points and the first coordinate scaling ratio.

In some embodiments, the normalized coordinates of the operating point may be obtained by multiplying the coordinates of the operating point in the virtual canvas by the first coordinate scaling ratio.

In some embodiments, in this embodiment, the normalized coordinates of the operating point in the virtual canvas may be obtained by multiplying the virtual canvas coordinates P2 of the operating point by the first coordinate scaling ratio scale. For example, the coordinates P2 of the operating point in the virtual canvas are set to (−240, 160), and the first coordinate scaling ratio scale is 2/680, then the normalized coordinates of the operating point in the virtual canvas is P2*scale=(−240, 160)*2/680=(−0.706, 0.471), where the results (−0.706, 0.471) are shown for ease of description in a manner of rounding to three decimal places. In an actual situation, a specific manner of giving the results may be adjusted in a customized manner.

In some embodiments, step S330 to S340 may be considered as an implementation of step S220 in FIG. 4.

Step S350. Determine a second coordinate scaling ratio according to a size of the target canvas and the specified normalized size.

In some embodiments, the second coordinate scaling ratio may be obtained by dividing the width of the target canvas by the width of the normalized virtual canvas.

Step S360. Obtain target canvas coordinates of the operating points according to the normalized coordinates of the operating points and the second coordinate scaling ratio.

During specific implementation, an x-axis target canvas coordinate of the operating point may be obtained by adding a normalized x-axis coordinate to a preset value and then multiplying the obtained sum by the second coordinate scaling ratio, a y-axis target canvas coordinate of the operating point may be obtained by subtracting a normalized y-axis coordinate of the operating point from a preset value and then multiplying the obtained difference by the second coordinate scaling ratio, and the target canvas coordinates of the operating point in the target canvas are obtained by combining the x-axis target canvas coordinate and the y-axis target canvas coordinate of the operating point.

Figure 7:
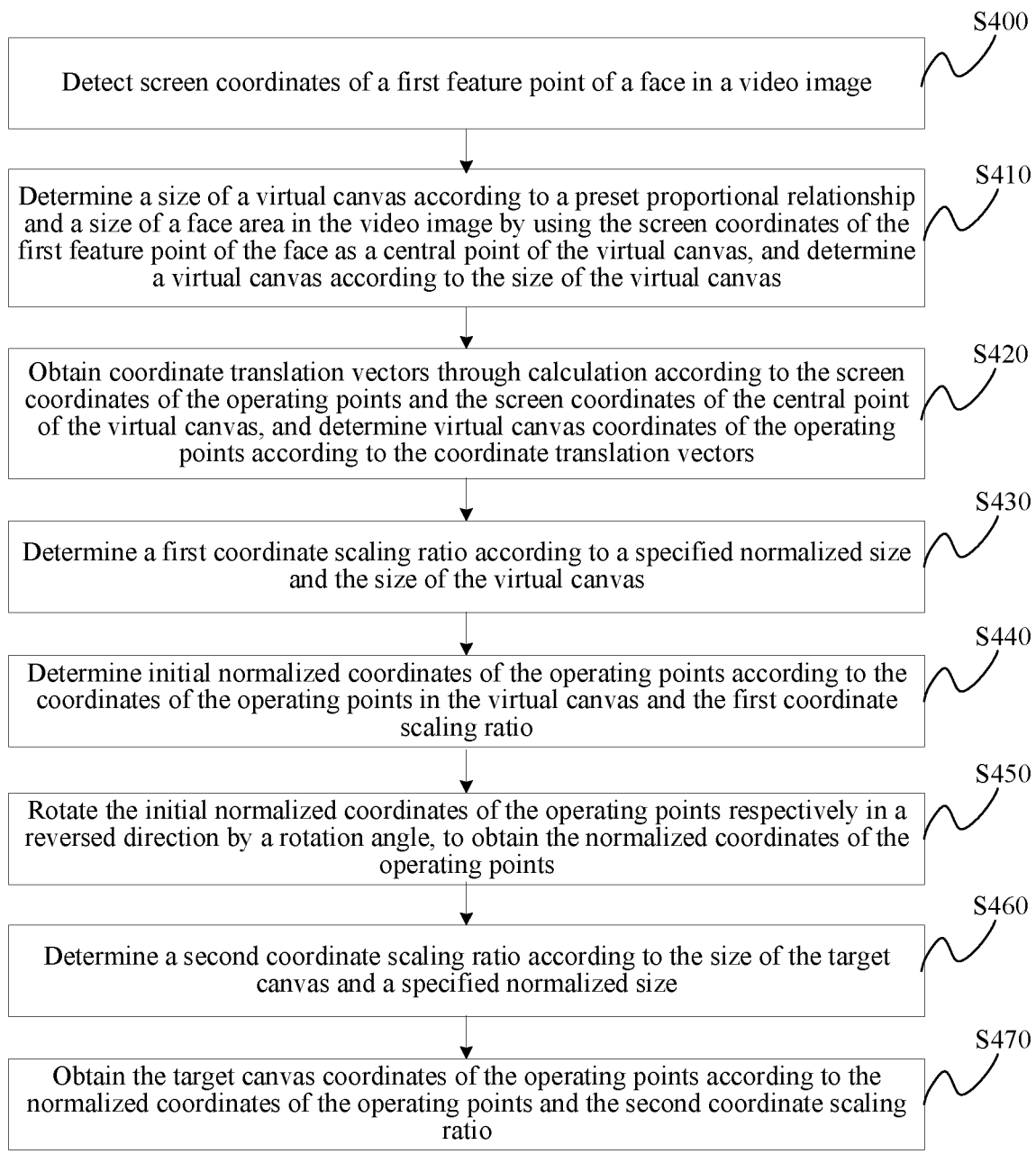
FIG. 7 is a flowchart of still another method for converting screen coordinates of operating points into target canvas coordinates.

In some embodiments, in a case that the rotation angle of the face in the video image is not 0, FIG. 7 shows a flowchart of still another method for converting screen coordinates of operating points into target canvas coordinates according to an embodiment of this application. Referring to FIG. 7, the method may include:

Step S400. Detect screen coordinates of a first feature point of a face in the video image.

Step S410. Determine a size of a virtual canvas according to a preset proportional relationship and a size of a face area in the video image by using the screen coordinates of the first feature point of the face as a central point of the virtual canvas, and determine a virtual canvas according to the size of the virtual canvas.

In an example, the virtual canvas may be square-shaped. In this embodiment, the virtual canvas may be determined by using coordinates of the nasal bone of the face in the video image as the central point of the virtual canvas and using twice the width of the face as the width of the virtual canvas.

For example, assuming that a resolution of the screen is 720*1280, in a case that the coordinates of the nasal bone of the face in the video image are determined to be (360, 500), and a resolution of the width of the face is determined to be 340 (which may be considered as a width distance between coordinates of the left temple and the right temple of the face), then the coordinates (360, 500) of the nasal bone of the face may be used as the central point of the virtual canvas, to obtain a virtual canvas (a resolution is 680*680) of which the width is twice the width of the face. In some embodiments, step S400 to step S410 may be considered as one embodiment of step S200 shown in FIG. 4, where the rotation angle of the face in the video image is not 0.

Step S300 to step S310 shown in FIG. 6 differ from step S400 to step S410 shown in FIG. 7 in that the rotation angle of the face in the video image in FIG. 6 is 0, and the rotation angle of the face in the video image in FIG. 7 is not 0.

Step S420. Obtain coordinate translation vectors through calculation according to the screen coordinates of the operating points and the screen coordinates of the central point of the virtual canvas, and determine virtual canvas coordinates of the operating points according to the coordinate translation vectors.

During specific implementation, coordinates of the operating point in the virtual canvas are obtained by subtracting the x-axis coordinate of the central point of the virtual canvas from an x-axis screen coordinate of the operating point and subtracting the y-axis coordinate of the central point of the virtual canvas from a y-axis screen coordinate of the operating point.

In some embodiments, step S420 may be considered as an implementation of step S210 shown in FIG. 4, and reference may be made to step S320 shown in FIG. 6.

In some embodiments, in a case that Euler angle detection (an angle between the rotation angle of the face and x, y, and z axes in the three-dimensional space) is further supported in face detection, coordinates of the operating point in the virtual canvas are obtained by subtracting the x-axis coordinate of the central point of the virtual canvas from an x-axis screen coordinate of the operating point, subtracting the y-axis coordinate of the central point of the virtual canvas from a y-axis screen coordinate of the operating point, and further multiplying the obtained results by a three-dimensional rotation matrix.

Step S430. Determine a first coordinate scaling ratio according to a specified normalized size and the size of the virtual canvas.

In some embodiments, the first coordinate scaling ratio may be obtained by dividing the width of the normalized virtual canvas by the width of the virtual canvas when it is drawn.

Step S440. Determine initial normalized coordinates of the operating points according to the coordinates of the operating points in the virtual canvas and the first coordinate scaling ratio.

In some embodiments, the initial normalized coordinates of the operating point may be obtained by multiplying the coordinates of the operating point in the virtual canvas by the first coordinate scaling ratio.

Step S450. Rotate the initial normalized coordinates of the operating points respectively in a reverse direction by a rotation angle, to obtain the normalized coordinates of the operating points.

In some embodiments, in this embodiment, a two-dimensional rotation matrix corresponding to the rotation angle may be determined. Regarding the operating points, the normalized coordinates of the operating points may be determined according to the initial normalized coordinates of the operating points and the two-dimensional rotation matrix. For example, the normalized coordinates of the operating points may be obtained by multiplying the initial normalized coordinates of the operating points by the two-dimensional rotation matrix.

In a case that the rotation angle of the face in the video image is set to θ, and M(θ) represents a corresponding two-dimensional rotation matrix, a formula example of the two-dimensional rotation matrix may be as follows:

$$\begin{bmatrix} x' \\ y' \\ 1 \end{bmatrix} = \begin{bmatrix} \cos(\theta) & -\sin(\theta) & 0 \\ \sin(\theta) & \cos(\theta) & 0 \\ 0 & 0 & 1 \end{bmatrix} \cdot \begin{bmatrix} x \\ y \\ 1 \end{bmatrix}$$

For example, in a case that initial normalized coordinates of one operating point are set to (−0.706, 0.471), then a manner of obtaining the normalized coordinates of the operating point may be as follows:

M(θ)*(−0.706, 0.471). In a case that θ is set to 30°, then results of the normalized coordinate are (−0.376, 0.761).

Figure 8:
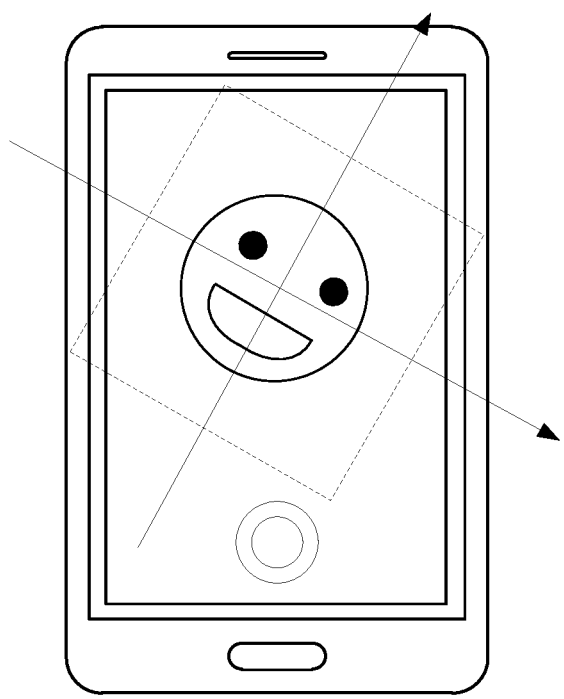
FIG. 8 is a schematic diagram after a virtual canvas is rotated.

As shown in FIG. 8, because there is a rotation angle of the face in the video image, the virtual canvas coordinates need to be rotated when the virtual canvas coordinates are normalized. This rotation operation is equivalent to rotating the virtual canvas. A positive direction and a negative direction of the rotation angle may be customized with reference to a center line of the video image, and this is not limited in this embodiment.

In some embodiments, step S430 to step S450 may be considered as an implementation of step S220 in FIG. 4, and differ from step S330 to step S340 shown in FIG. 6 in that, the method shown in FIG. 7 is based on a case that the rotation angle of the face in the video image is not 0, results obtained in step S340 in FIG. 6 may be considered as the initial normalized coordinates of the method shown in FIG. 7, and based on this, in the method shown in FIG. 7, the initial normalized coordinates of the operating points need to be further rotated in a reverse direction based on the rotation angle.

Step S460. Determine a second coordinate scaling ratio according to the size of the target canvas and a specified normalized size.

In some embodiments, the second coordinate scaling ratio may be obtained by dividing the width of the target canvas by the width of the normalized virtual canvas.

Step S470. Obtain the target canvas coordinates of the operating points according to the normalized coordinates of the operating points and the second coordinate scaling ratio.

Specifically, an x-axis target canvas coordinate of the operating point may be obtained by adding a normalized x-axis coordinate to a preset value and then multiplying the obtained sum by the second coordinate scaling ratio, a y-axis target canvas coordinate of the operating point may be obtained by subtracting a normalized y-axis coordinate of the operating point from a preset value and then multiplying the obtained difference by the second coordinate scaling ratio, and the target canvas coordinates of the operating point in the target canvas are obtained by combining the x-axis target canvas coordinate and the y-axis target canvas coordinate of the operating point.

This embodiment not only supports processing in a two-dimensional coordinate system, but also supports processing in a three-dimensional coordinate system, and one difference between the two lies in that, compared with the two-dimensional coordinate system, as shown in parts of step S320 and S420, in a case that the screen coordinates of the operating points are converted to the coordinates in the virtual canvas in a three-dimensional coordinate system, a three-dimensional rotation matrix further needs to be multiplied on the basis of the processing in the two-dimensional coordinate system.

In a scenario that a doodle is drawn on a face in a video image described above, an objective of implementing adaptation to diversity of faces is achieved by using a virtual canvas as an intermediate state of coordinate conversion from screen coordinates of operating points to target canvas coordinates. The coordinate conversion, from the screen coordinates of the operating points to the target canvas coordinates, performed by using the virtual canvas is merely one example, and serves as an alternative solution. In a case that no doodle is drawn on a face in the video image, a doodle area corresponding to the size of the target canvas may also be displayed on the screen in this embodiment (in some embodiments, further, the location of the doodle area may be moved and adjusted by the operations of the user, but the size of the area remains unchanged), so that the user doodles in the doodle area, to implement direct conversion from the screen coordinates of the operating points to the target canvas coordinates (the direct herein is provided relative to an indirect manner in which the virtual canvas is used as an intermediate state). Correspondingly, the target canvas on which the graphic image is drawn may be overlaid on the video image according to the location of the doodle area in the video image.

Further, after the target canvas coordinates of the operating points in the screen are determined, and a corresponding graphic image is drawn on the target canvas, the target canvas on which the graphic image is drawn may be added to the dynamic video image in a form of a sticker, to produce the effect that the target canvas on which the graphic image is drawn moves along with the face in the video image.

In some embodiments, after a graphic image is drawn on the target canvas according to the target canvas coordinates of the operating points, the target canvas on which the graphic image is drawn may be used as a sticker-type special effect element and overlaid on the video image. Using OpenGL as an example, vertex coordinates and a rotation angle (corresponding to the rotation angle of the face in the video image) of the target canvas on which the graphic image is drawn may be transmitted into a vertex shader, and the vertex shader obtains coordinates of an overlaid location of the target canvas on which the graphic image is drawn on the video image according to the rotation angle and the vertex coordinates of the target canvas on which the graphic image is drawn, to further overlay the target canvas on which the graphic image is drawn on the video image according to the coordinates of the overlaid location. Further, when the target canvas on which the graphic image is drawn is added to the face in the video image, in a case that the video image is a dynamic video image and the face moves, the target canvas on which the graphic image is drawn may move along with the face in the video image.

In some embodiments, in a case that the target canvas on which the graphic image is drawn is overlaid on the video image in a three-dimensional coordinate system, a principle of overlaying a sticker onto the video image in the three-dimensional space may be adopted. For example, the perspective projection technology or the like may be adopted.

Figure 9:
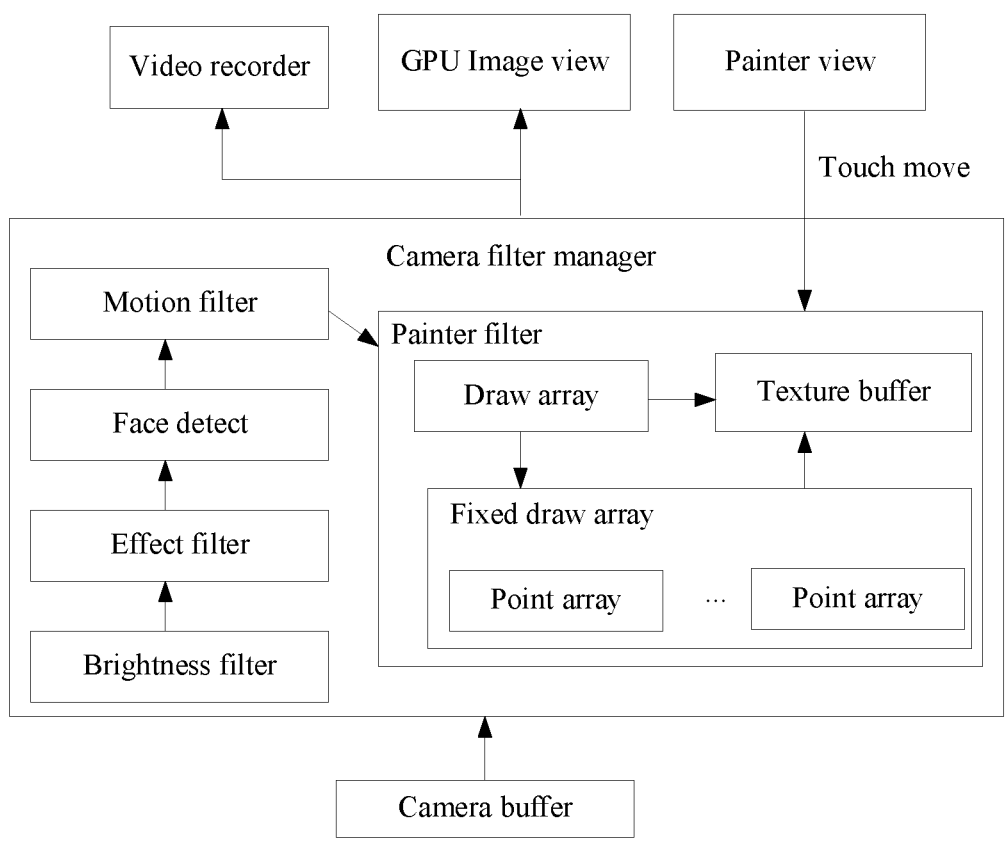
FIG. 9 is a schematic framework diagram of an application program to which a painter filter is added.

In some embodiments, the video image processing method provided in this embodiment may exist in a form of a painter filter, and may be added to a filter chain of an application supporting video recording. In the filter chain, there are other filters such as a beauty filter, a whitening filter, face detection, and a deformation filter. The video image processing method provided in this embodiment may be added to the end of the filter chain in a form of a painter filter, to draw a doodle on the video image in a processing form of a filter, and the video image data on which the target canvas on which the graphic image is drawn is overlaid after the doodle is drawn may be output to the screen or written into a local video file for storage. A framework of an application program to which a painter filter is added may be shown in FIG. 9, to which reference may be made.

The video image processing method provided in this embodiment can support the user to draw a doodle on the video image, and use the target canvas on which the graphic image is drawn obtained based on the doodle drawn by the user as a special effect element. Content of the special effect element may be adjusted according to a difference (that is, a difference between the operating points involved in the doodle made by the user on the screen) between doodle operations of the user on the screen, to make content of video special effects added to the video image richer and more changeable. As a result, limitations on use of special effect elements are reduced, and flexibility of adding special effects to a video image is improved.

A video image processing apparatus provided in an embodiment of this application is described below, and the video image processing apparatus described below may be considered as a program module that needs to be installed in a terminal for implementing the video image processing method provided in the embodiments of this application. For content of the video image processing apparatus described below, reference may be made to the corresponding content of the video image processing method described above.

Figure 10:
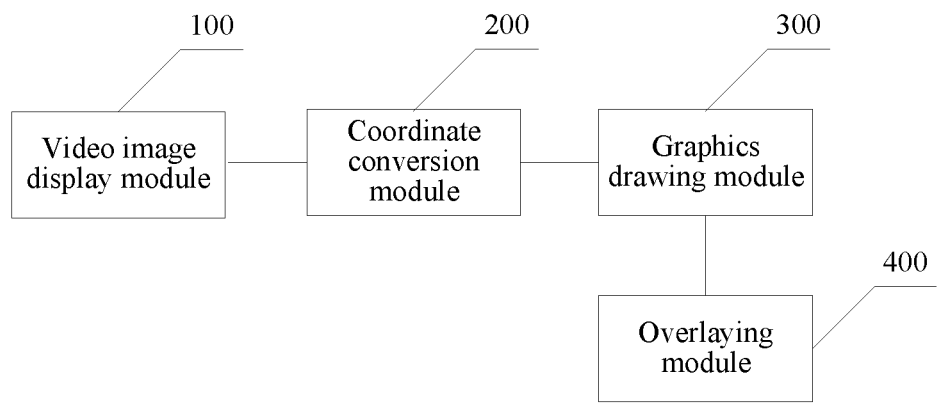
FIG. 10 is a block diagram of a video image processing apparatus according to an embodiment of this application.

FIG. 10 is a block diagram of a video image processing apparatus according to an embodiment of this application. The video image processing apparatus is applicable to a terminal. Specifically, the video image processing apparatus is applicable to a GPU of the terminal. Referring to FIG. 10, the video image processing apparatus may include: a video image display module 100, configured to display a captured video image on a screen; a coordinate conversion module 200, configured to detect operating points of a user on the screen, and convert screen coordinates of the operating points into target canvas coordinates in a target canvas; a graphics drawing module 300, configured to draw a graphic image on the target canvas according to the target canvas coordinates of the operating points; and an overlaying module 400, configured to overlay the target canvas on which the graphic image is drawn onto the video image.

In some embodiments, the coordinate conversion module 200 is configured to convert the screen coordinates of the operating points into target canvas coordinates in the target canvas, specifically including: determining a virtual canvas according to a facial feature in the video image, a size of the virtual canvas and a size of a facial feature area in the video image being in a preset proportional relationship; mapping the screen coordinates of the operating points to the virtual canvas, to obtain virtual canvas coordinates of the operating points; and mapping the virtual canvas coordinates of the operating points to the target canvas, to obtain target canvas coordinates of the operating points in the target canvas.

In some embodiments, the coordinate conversion module 200 is configured to determine a virtual canvas according to a facial feature in the video image, specifically including: detecting screen coordinates of a first feature point of a face in the video image; determining a size of a virtual canvas according to a preset proportional relationship and a size of a face area in the video image by using the screen coordinates of the first feature point of the face as a central point of the virtual canvas, and determining a virtual canvas according to the size of the virtual canvas. In some embodiments, the coordinate conversion module 200 is configured to map the screen coordinates of the operating points to the virtual canvas, to obtain virtual canvas coordinates of the operating points, specifically including: converting the screen coordinates of the operating points into coordinates in the virtual canvas according to the screen coordinates of the operating points and screen coordinates of the central point of the virtual canvas, to obtain virtual canvas coordinates of the operating points.

In some embodiments, in a two-dimensional coordinate system, the coordinate conversion module 200 is configured to convert the screen coordinates of the operating points into coordinates in the virtual canvas according to the screen coordinates of the operating points and coordinates of the central point of the virtual canvas, specifically including: obtaining coordinate translation vectors through calculation according to the screen coordinates of the operating points and the screen coordinates of the central point of the virtual canvas; and determining the virtual canvas coordinates of the operating points according to the coordinate translation vectors.

In some embodiments, in a three-dimensional coordinate system, the coordinate conversion module 200 is configured to convert the screen coordinates of the operating points into coordinates in the virtual canvas according to the screen coordinates of the operating points and coordinates of the central point of the virtual canvas, specifically including: for each operating point, obtaining coordinates of the operating point in the virtual canvas by subtracting the x-axis coordinate of the central point of the virtual canvas from an x-axis screen coordinate of the operating point, subtracting the y-axis coordinate of the central point of the virtual canvas from a y-axis screen coordinate of the operating point, and further multiplying the obtained results by a three-dimensional rotation matrix.

In some embodiments, the coordinate conversion module 200 is configured to map the virtual canvas coordinates of the operating points to the target canvas, to obtain target canvas coordinates of the operating points, specifically including: normalizing the virtual canvas coordinates of the operating points, to obtain normalized coordinates of the operating points; and mapping the normalized coordinates of the operating points to the target canvas, to obtain target canvas coordinates of the operating points.

In some embodiments, in a case that the rotation angle of the face in the video image is not 0, then the coordinate conversion module 200 is configured to normalize the virtual canvas coordinates of the operating points, to obtain normalized coordinates of the operating points, specifically including: determining a first coordinate scaling ratio according to a specified normalized size and the size of the virtual canvas; determining initial normalized coordinates of the operating points according to the virtual canvas coordinates of the operating points and the first coordinate scaling ratio; and rotating the initial normalized coordinates of the operating points respectively in a reverse direction by the rotation angle, to obtain the normalized coordinates of the operating points.

In some embodiments, the coordinate conversion module 200 may be specifically configured, when the first coordinate scaling ratio is determined according to the specified normalized size and the size of the virtual canvas, to divide the width of the normalized virtual canvas by the width of the virtual canvas when it is drawn, to obtain the first coordinate scaling ratio.

In some embodiments, the coordinate conversion module 200 may be specifically configured, when the initial normalized coordinates of the operating points are determined according to the virtual canvas coordinates of the operating points and the first coordinate scaling ratio, to obtain the initial normalized coordinates of the operating points by multiplying the virtual canvas coordinates of the operating points by the first coordinate scaling ratio.

In some embodiments, the coordinate conversion module 200 may be specifically configured, when the normalized coordinates of the operating points are obtained by rotating the initial normalized coordinates of the operating points respectively in a reverse direction by the rotation angle, to obtain the normalized coordinates of the operating points by multiplying the initial normalized coordinates of the operating points by a two-dimensional rotation matrix corresponding to the rotation angle.

In some embodiments, in a case that the rotation angle of the face in the video image is 0, then the coordinate conversion module 200 is configured to normalize the virtual canvas coordinates of the operating points, to obtain normalized coordinates of the operating points, specifically including: determining a first coordinate scaling ratio according to a specified normalized size and the size of the virtual canvas; and determining normalized coordinates of the operating points according to the virtual canvas coordinates of the operating points and the first coordinate scaling ratio.

In some embodiments, in a case that the rotation angle of the face in the video image is 0, the coordinate conversion module 200 may be specifically configured, when the normalized coordinates of the operating points are determined according to the virtual canvas coordinates of the operating points and the first coordinate scaling ratio, to obtain the normalized coordinates of the operating points by multiplying the virtual canvas coordinates of the operating points by the first coordinate scaling ratio.

In some embodiments, the coordinate conversion module 200 is configured to map the normalized coordinates of the operating points to the target canvas, to obtain target canvas coordinates of the operating points, specifically including: determining a second coordinate scaling ratio according to the size of the target canvas and the specified normalized size; and obtaining the target canvas coordinates of the operating points according to the normalized coordinates of the operating points and the second coordinate scaling ratio.

In some embodiments, the coordinate conversion module 200 may be specifically configured, when the second coordinate scaling ratio is determined according to the size of the target canvas and the specified normalized size, to obtain the second coordinate scaling ratio by dividing the width of the target canvas by the width of the normalized virtual canvas.

In some embodiments, the coordinate conversion module 200 may be specifically configured, when the target canvas coordinates of the operating points are obtained according to the normalized coordinates of the operating points and the second coordinate scaling ratio, to: for each operating point, obtain an x-axis target canvas coordinate of the operating point by adding a normalized x-axis coordinate to a preset value and then multiplying the obtained sum by the second coordinate scaling ratio, obtain a y-axis target canvas coordinate of the operating point by subtracting a normalized y-axis coordinate of the operating point from a preset value and then multiplying the obtained difference by the second coordinate scaling ratio, and obtain the target canvas coordinates of the operating point in the target canvas by combining the x-axis target canvas coordinate and the y-axis target canvas coordinate of the operating point.

In some embodiments, the coordinate conversion module 200 is configured to detect operating points of a user on the screen, specifically including: detecting the operating points of the user on the screen in response to an operation of the user for triggering entering a doodle mode.

In some embodiments, the overlaying module 400 is configured to overlay the target canvas on which the graphic image is drawn onto the video image, specifically including: transmitting vertex coordinates of the target canvas on which the graphic image is drawn and the rotation angle of the face in the video image into a vertex shader, to obtain coordinates of an overlaid location of the target canvas on which the graphic image is drawn on the video image through calculation by the vertex shader according to the rotation angle and the vertex coordinate; and overlaying the target canvas on which the graphic image is drawn onto the video image according to the coordinates of the overlaid location, and making the target canvas on which the graphic image is drawn move along with the face in the video image.

In some embodiments, in another implementation, the coordinate conversion module 200 is configured to detect operating points of a user on the screen, and convert screen coordinates of the operating points into target canvas coordinates in a target canvas, specifically including: detecting operating points of the user in a displayed doodle area of which the size corresponds to that of the target canvas on the screen, and converting the screen coordinates of the operating points in the doodle area into the target canvas coordinates in the target canvas.

In some embodiments, in a three-dimensional coordinate system, the overlaying module 400 may overlay the target canvas on which the graphic image is drawn onto the video image by using the perspective projection technology.

Figure 11:
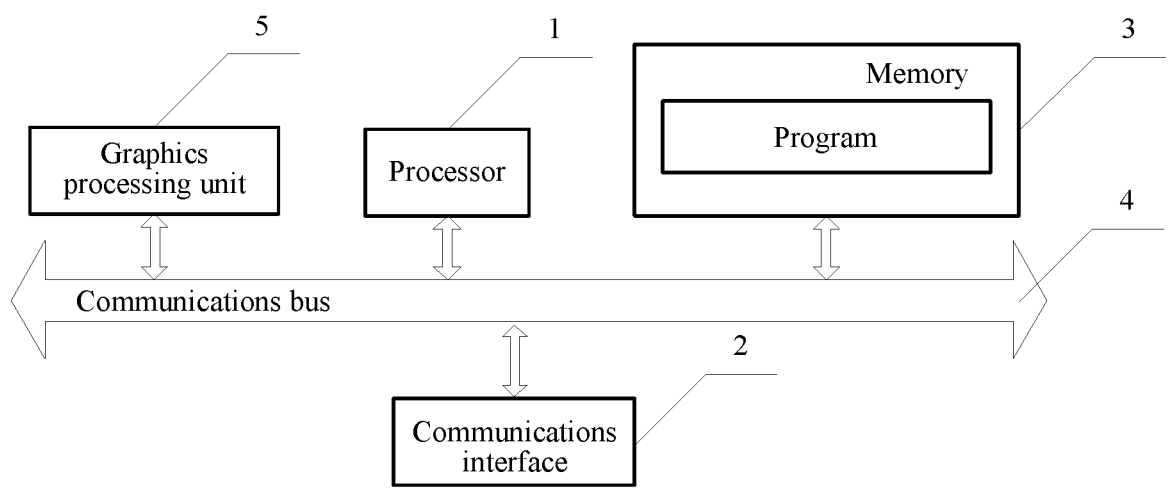
FIG. 11 is a block diagram of a hardware structure of a terminal.

In some embodiments, FIG. 11 shows a block diagram of a hardware structure of a terminal. Referring to FIG. 11, the terminal may include: at least one processor 1, at least one communications interface 2, at least one memory 3, at least one communications bus 4, and at least one GPU 5.

In some embodiments, the communications interface 2 may be an interface of a communications module, for example, an interface of a GSM module.

The processor 1 may be a central processing unit (CPU) or an application specific integrated circuit (ASIC) or may be configured as one or more integrated circuits for implementing the embodiments of the present application.

The memory 3 may include a high-speed random access memory (RAM), and may further include a non-volatile memory, for example, at least one magnetic disk memory.

The memory 3 stores an executable program. The program may be executed by the processor or the GPU (in some special cases, a program corresponding to the video image processing method provided in this embodiment may alternatively be executed and implemented by the processor), and the program is specifically used for: displaying a captured video image on a screen; detecting operating points of a user on the screen, and converting screen coordinates of the operating points into target canvas coordinates in a target canvas; drawing a graphic image on the target canvas according to the target canvas coordinates of the operating points; and overlaying the target canvas on which the graphic image is drawn onto the video image.

In some embodiments, for refined functions and extended functions of the program, refer to the description of a corresponding part above.

An embodiment of this application may further provide a storage medium. The storage medium stores a program suitable for being executed by the processor, and the program is used for: displaying a captured video image on a screen; detecting operating points of a user on the screen, and converting screen coordinates of the operating points into target canvas coordinates in a target canvas; drawing a graphic image on the target canvas according to the target canvas coordinates of the operating points; and overlaying the target canvas on which the graphic image is drawn onto the video image.

An embodiment of this application further provides a computer program product including an instruction, the instruction, when run on a computer, causing the computer to perform the video image processing method according to this application.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not considered that the implementation goes beyond the scope of the present application.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the art.

The foregoing description of the disclosed embodiments enables a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present application is not limited to these embodiments illustrated in the present disclosure, but needs to conform to the broadest scope consistent with the principles and novel features disclosed in the present disclosure.

What is claimed is:

1. A video image processing method, applied to a terminal, the video image processing method comprising:
  displaying a captured video image on a screen;
  detecting operating points of a user on the screen, and converting screen coordinates of the operating points into target canvas coordinates in a target canvas;
  mapping the screen coordinates of the operating points to a virtual canvas, to obtain virtual canvas coordinates of the operating points;
  mapping the virtual canvas coordinates of the operating points to the target canvas, to obtain target canvas coordinates of the operating points in the target canvas;
  drawing a graphic image on the target canvas according to the target canvas coordinates of the operating points; and
  overlaying the target canvas onto the video image.

2. The video image processing method according to claim 1, wherein the converting screen coordinates of the operating points into target canvas coordinates in a target canvas comprises:
  determining the virtual canvas according to a facial feature in the video image, a size of the virtual canvas and a size of a facial feature area in the video image being proportional to each other.

3. The video image processing method according to claim 2, wherein the determining a virtual canvas according to a facial feature in the video image comprises:
  detecting screen coordinates of a first feature point of a face in the video image;
  determining a size of the virtual canvas according to the proportional relationship and a size of a face area in the video image by using the screen coordinates of the first feature point of the face as a central point of the virtual canvas; and
  determining the virtual canvas according to the size of the virtual canvas.

4. The video image processing method according to claim 1, wherein the mapping the screen coordinates of the operating points to the virtual canvas, to obtain virtual canvas coordinates of the operating points comprises:
  converting the screen coordinates of the operating points into coordinates in the virtual canvas according to the screen coordinates of the operating points and screen coordinates of the central point of the virtual canvas, to obtain virtual canvas coordinates of the operating points.

5. The video image processing method according to claim 4, wherein the converting the screen coordinates of the operating points into coordinates in the virtual canvas according to the screen coordinates of the operating points and coordinates of the central point of the virtual canvas comprises:

obtaining coordinate translation vectors according to the screen coordinates of the operating points and the screen coordinates of the central point of the virtual canvas; and determining the virtual canvas coordinates of the operating points according to the coordinate translation vectors.

6. The video image processing method according to claim 2, wherein the mapping the virtual canvas coordinates of the operating points to the target canvas, to obtain target canvas coordinates of the operating points comprises:

normalizing the virtual canvas coordinates of the operating points, to obtain normalized coordinates of the operating points; and mapping the normalized coordinates of the operating points to the target canvas, to obtain target canvas coordinates of the operating points.

7. The video image processing method according to claim 6, wherein the normalizing the virtual canvas coordinates of the operating points, to obtain normalized coordinates of the operating points comprises:

determining a first coordinate scaling ratio according to a specified normalized size and the size of the virtual canvas if a rotation angle of the face in the video image is not 0;

determining initial normalized coordinates of the operating points according to the virtual canvas coordinates of the operating points and the first coordinate scaling ratio; and rotating the initial normalized coordinates of the operating points respectively in a reverse direction by the rotation angle, to obtain the normalized coordinates of the operating points.

8. The video image processing method according to claim 6, wherein the normalizing the virtual canvas coordinates of the operating points, to obtain normalized coordinates of the operating points comprises:

determining a first coordinate scaling ratio according to a specified normalized size and the size of the virtual canvas if a rotation angle of the face in the video image is 0; and determining normalized coordinates of the operating points according to the virtual canvas coordinates of the operating points and the first coordinate scaling ratio.

9. The video image processing method according to claim 6, wherein the mapping the normalized coordinates of the operating points to the target canvas, to obtain target canvas coordinates of the operating points comprises:

determining a second coordinate scaling ratio according to the size of the target canvas and the specified normalized size; and obtaining the target canvas coordinates of the operating points according to the normalized coordinates of the operating points and the second coordinate scaling ratio.

10. The video image processing method according to claim 1, wherein the detecting operating points of a user on the screen comprises:

detecting the operating points of the user on the screen in response to an operation of the user for triggering entering a doodle mode.

11. The video image processing method according to claim 1, wherein the overlaying the target canvas onto the video image comprises:

transmitting vertex coordinates of the target canvas on which the graphic image is drawn and the rotation angle of the face in the video image into a vertex shader, to obtain coordinates of an overlaid location of the target canvas on which the graphic image is drawn on the video image by the vertex shader according to the rotation angle and the vertex coordinate; and overlaying the target canvas on which the graphic image is drawn onto the video image according to the coordinates of the overlaid location, and making the target canvas move along with the face in the video image.

12. A terminal, comprising a memory, a processor, and a graphic processing unit; the memory storing an executable program, the program being executable by the processor or the graphic images processing unit, and the program implementing a method of:

displaying a captured video image on a screen;

detecting operating points of a user on the screen, and converting screen coordinates of the operating points into target canvas coordinates in a target canvas;

mapping the screen coordinates of the operating points to a virtual canvas, to obtain virtual canvas coordinates of the operating points;

mapping the virtual canvas coordinates of the operating points to the target canvas, to obtain target canvas coordinates of the operating points in the target canvas;

drawing a graphic image on the target canvas according to the target canvas coordinates of the operating points; and overlaying the target canvas onto the video image.

13. The terminal of claim 12, wherein the converting screen coordinates of the operating points into target canvas coordinates in a target canvas comprises:

determining the virtual canvas according to a facial feature in the video image, a size of the virtual canvas and a size of a facial feature area in the video image being proportional to each other.

14. The terminal of claim 13, wherein the determining a virtual canvas according to a facial feature in the video image comprises:

detecting screen coordinates of a first feature point of a face in the video image;

determining a size of the virtual canvas according to the proportional relationship and a size of a face area in the video image by using the screen coordinates of the first feature point of the face as a central point of the virtual canvas; and determining the virtual canvas according to the size of the virtual canvas.

15. The terminal of claim 12, wherein the mapping the screen coordinates of the operating points to the virtual canvas, to obtain virtual canvas coordinates of the operating points comprises:

converting the screen coordinates of the operating points into coordinates in the virtual canvas according to the screen coordinates of the operating points and screen coordinates of the central point of the virtual canvas, to obtain virtual canvas coordinates of the operating points.

16. The terminal of claim 15, wherein the converting the screen coordinates of the operating points into coordinates in the virtual canvas according to the screen coordinates of the operating points and coordinates of the central point of the virtual canvas comprises:
   obtaining coordinate translation vectors according to the screen coordinates of the operating points and the screen coordinates of the central point of the virtual canvas; and
   determining the virtual canvas coordinates of the operating points according to the coordinate translation vectors.

17. A non-transitory storage medium, the storage medium being configured to store an executable instruction, the instruction, when run on a computer, causing the computer to perform:
   displaying a captured video image on a screen;
   detecting operating points of a user on the screen, and converting screen coordinates of the operating points into target canvas coordinates in a target canvas;
   mapping the screen coordinates of the operating points to a virtual canvas, to obtain virtual canvas coordinates of the operating points;
   mapping the virtual canvas coordinates of the operating points to the target canvas, to obtain target canvas coordinates of the operating points in the target canvas;
   drawing a graphic image on the target canvas according to the target canvas coordinates of the operating points; and
   overlaying the target canvas onto the video image.

18. The storage medium of claim 17, wherein the converting screen coordinates of the operating points into target canvas coordinates in a target canvas comprises:
   determining the virtual canvas according to a facial feature in the video image, a size of the virtual canvas and a size of a facial feature area in the video image being proportional to each other.

19. The storage medium of claim 18, wherein the determining a virtual canvas according to a facial feature in the video image comprises:
   detecting screen coordinates of a first feature point of a face in the video image;
   determining a size of the virtual canvas according to the proportional relationship and a size of a face area in the video image by using the screen coordinates of the first feature point of the face as a central point of the virtual canvas; and
   determining the virtual canvas according to the size of the virtual canvas.

20. The storage medium of claim 17, wherein the mapping the screen coordinates of the operating points to the virtual canvas, to obtain virtual canvas coordinates of the operating points comprises:
   converting the screen coordinates of the operating points into coordinates in the virtual canvas according to the screen coordinates of the operating points and screen coordinates of the central point of the virtual canvas, to obtain virtual canvas coordinates of the operating points.

* * * * *